United States Patent Office 2,980,683
Patented Apr. 18, 1961

2,980,683

PROCESS FOR PREPARING β-SUBSTITUTED-ETHYL PIPERAZINES

Harold E. Zaugg, Lake Forest, Arthur W. Weston, Lake Bluff, Morris Freifelder, Waukegan, and Raymond J. Michaels, Jr., Mundelein, Ill., assignors to Abbott Laboratories, North Chicago, Ill., a corporation of Illinois No Drawing. Filed Jan. 13, 1959, Ser. No. 786,457

7 Claims. (Cl. 260—268)

This invention relates to a method for preparing chemical compounds and salts thereof, the base of which is represented by the following structure:

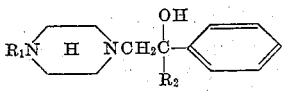

where $R_1$ is loweralkyl such as methyl and arylalkyl such as benzyl and $R_2$ is phenyl or cyclohexyl.

Compounds of the foregoing structure possess valuable antispasmodic and anti-Parkinsonism properties and are the subject of co-pending applications, Serial Nos. 608,-657, 608,659 and 608,690, all filed on September 10, 1956, now Patent Numbers 2,881,172, 2,907,765, and 2,907,766, respectively.

The process herein disclosed substantially involves the condensation of approximately equimolar amounts of an alkyl chloroacetate with a substituted piperazine represented by:

where R is loweralkyl such as methyl and an arylalkyl such as benzyl. The resulting substituted piperazine acetic acid ethyl ester is then reacted with the Grignard reagent phenylmagnesium halide, in a high boiling organic solvent and the Grignard complex is decomposed to produce the diphenyl carbinol derivative of the substituted piperazine.

The sequence of the foregoing reaction steps may be represented by the following:

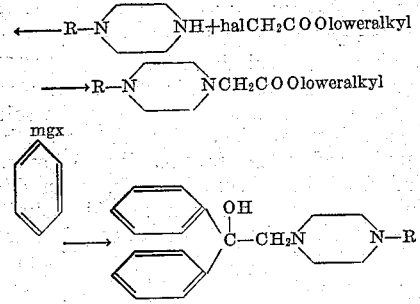

The product as represented by the final chemical structure is the desired form when R is methyl. When R is benzyl, the compound is converted to the desired unsubstituted piperazine by a debenzylating step, in particular, a reduction by catalytic hydrogenation.

The particular base which is obtained is then dissolved in alcoholic-hydrogen chloride to obtain the dihydrochloride salt. Thereafter, one of the diphenyl groups in the compound may be reduced by hydrogenation in the presence of an appropriate catalyst to prepare the cyclohexyl phenyl carbinol derivative of the methylpiperazine dihydrochloride. A quaternary ammonium salt is prepared by liberating the base in an alkaline solution, thereafter dissolving the base in a compatible solvent such as methyl ethyl ketone and adding thereto an alkyl halide. The term alkyl halide is meant to include the well-known quaternizing agents which result in non-toxic quaternary ammonium salt forms. Without restricting the operable quaternizing agents, several representative examples include the bromides and sulfates of methyl, ethyl, butyl, propyl, isobutyl alkyls.

The appropriate solvent for preparing the Grignard complex must be selected from oxygenated solvents such as ether, tetrahydrofuran and the like. In the practice of this process, it is provided that a higher boiling hydrocarbon water-immiscible organic solvent or an oxygenated organic solvent is employed in the step for reacting the piperazine derivative with the Grignard complex. The higher boiling solvent allows a hotter reaction temperature to complete the conversion to the desired carbinol in one step. Lower reaction temperatures result in ketone production rather than the desired carbinols. The selected solvent must have a boiling point of at least 60° C. and solvents which satisfy this requirement can be selected from tetrahydrofuran, benzene, toluene, xylene and similar higher boiling organic solvents.

The following examples illustrate the invention, but it should be understood that they are not intended to limit the process to the exact ingredients and proportions employed therein.

EXAMPLE I

*N-(β,β-diphenyl-β-hydroxyethyl)-N'-methylpiperazine*

In a 2-liter 3-neck round bottom flask fitted with a stirrer, separatory funnel, and a condenser protected with a calcium chloride drying tube is placed 36 grams (1.5 moles) of magnesium turnings and 100 cc. of dry ether is added. A crystal of iodine and a few cc. of a composition comprising 235.5 grams (1.5 moles) of bromobenzene or chlorobenzene dissolved in 500 cc. of dry ether is then added. The mixture is stirred and when the reaction commences, the balance of the bromobenzene dissolved in dry ether is added dropwise at a rate to cause vigorous refluxing. The mixture is then refluxed for one hour, after which time the ether is distilled off and 600 cc. of dry benzene is added. To this mixture is added dropwise 55.8 grams (0.3 mole) of N-methyl-N'-piperazine acetic acid ethyl ester (see Example V) dissolved in 400 cc. of dry benzene at a rate to cause gentle refluxing. The resulting mixture is stirred and refluxed for 16 hours.

After concluding the refluxing, the mixture is cooled and 400 cc. of a solution of ammonium chloride is added dropwise with stirring to decompose the Grignard complex. The mixture is filtered and the gelatinous solid is thoroughly washed with three 300 cc. portions of benzene. The benzene layer is then separated and concentrated to dryness. The oily residue is fractionated to remove the lower boiling fractions and the N-(β-diphenyl-β-hydroxyethyl)-N'-methylpiperazine base is collected in a yield of 61.6 grams (69 percent) having a boiling point of 203–206° (1.5 mm.) $n_D^{25}$ 1.5716. The base upon cooling crystallizes having a melting point of 70–71° C.

EXAMPLE II

*N-(β,β-diphenyl-β-hydroxyethyl)-N'-methylpiperazine dihydrochloride*

The base of Example I (57.8 grams) is dissolved in 250 cc. of isopropyl alcohol and 150 cc. of isopropyl alcoholic-hydrogen chloride is added. The latter solution contains about 15 percent more hydrogen chloride than is necessary for the preparation of the dihydrochloride salt. The dihydrochloride salt of N-(β-diphenyl-β-hydroxyethyl)-N'-methylpiperazine crystallizes out of the warm solution. The mixture is cooled, filtered and dried. The product is obtained in a yield of 72 grams having a melting point of 224–226°. Recrystallization from approximately 500 cc. of methanol results in obtaining 50 grams of the dihydrochloride salt of the product melting at 226–227° C. After concentrating the filtrate to about 150–200 cc., 13.3 grams more of the salt product is obtained which melts at 226–227° C. The total weight obtained of the dihydrochloride salt of N-(β-diphenyl-β-hydroxyethyl)-N'-methylpiperazine is 63.3 grams which is an 87.5 percent conversion to pure salt.

EXAMPLE III

N-(β-cyclohexyl-β-phenyl-β-hydroxyethyl)-N'-methylpiperazine dihydrochloride

The product of Example II (11 grams, 0.03 mole) is added to 30 cc. of water and then 0.33 gram (about 3% based on chemical) of platinum oxide is added. The mixture is hydrogenated at 55–60° C. under 30 pounds pressure. The reduction is complete in 3–4 hours. The mixture is filtered while warm and then the filtrate is concentrated to dryness under reduced pressure. Following this drying step, about 125 cc. of 12A alcohol is added and the mixture is heated until the solid products are dissolved. Thereafter, the solution is cooled, filtered and the precipitate is dried overnight. The yield of product is 10.6 grams which is a yield of 94 percent. The melting point is 239–241° C.

EXAMPLE IV

N-(β-cyclohexyl-β-phenyl-β-hydroxyethyl)-N'-methylpiperazine methosulfate

The product of Example III is dissolved in 50 cc. of water and an excess of a 40 percent sodium hydroxide solution is added until the resulting solution is strongly alkaline. The liberated base is then extracted twice with ether or toluene. The two extractions are combined and dried over anhydrous sodium sulfate. The drying agent is filtered off and the solvent solution is concentrated to dryness. The separated base is dissolved in 75 cc. of methyl ethyl ketone and to this solution is added 4.1 grams (0.0325 mole) of dimethyl sulfate. The quaternary salt of N-(β-cyclohexyl-β-phenyl-β-hydroxyethyl)-N'-methylpiperazine is crystallized out of solution after a few minutes. The mixture is allowed to stand at room temperature for two hours and after cooling, the product N-(β-cyclohexyl-β-phenyl-β-hydroxyethyl)-N'-methylpiperazine methosulfate, is filtered from the mixture in a yield of 12.0 grams (86%) having a melting point of 211–212° C.

EXAMPLE V

N-methyl-N'-piperazine acetic acid ethyl ester

Into a 3-liter 3-neck round bottom flask fitted with a stirrer and a condenser protected with a calcium chloride drying tube is placed 200 grams (2 moles) of N-methylpiperazine, 245 grams (2 moles) of ethyl chloroacetate, 336 grams (4 moles) of sodium bicarbonate and 1800 cc. of 12A ethyl alcohol. The mixture is stirred and refluxed for 16 hours. The reaction mixture is then cooled in an ice bath and the inorganic salts are filtered off. The alcohol filtrate is then concentrated to dryness under reduced pressure and the oily residue is subsequently fractioned to yield 288.3 grams of N-methyl-N'-piperazine acetic acid ethyl ester which is a yield of 75 percent. The boiling point is 119–123° C. (13 mm.), $n_D^{25}$ 1.4597.

The Grignard reaction of Example I can be performed in many organic solvents such as ether, toluene, tetrahydrofuran, xylene and the like, but it has been found that the use of benzene results in slightly higher yields thus making it the preferred solvent.

The hydrogenation step of Example III can be performed on the bases prepared by the disclosed process, however, it is preferred to carry out the hydrogenation after purifying the product as the dihydrochloride salt by the process outlined in Example II. This step results in better yields.

A wide range of concentrations of the platinum oxide catalyst can be employed in the hydrogenation step, but it has been found that about a 3 percent ratio of such catalyst to the reactant N-(β-diphenyl-β-hydroxyethyl)-N'-methylpiperazine, provides complete reduction.

In preparing the methosulfate salt of N-(β-cyclohexyl-β-phenyl-β-hydroxyethyl)-N'-methylpiperazine, the base is liberated from the halide salt thereof and the base may be dissolved in organic solvents such as acetone, ether, chloroform, isopropyl alcohol and the like; however, it has been found that the use of methyl ethyl ketone results in a somewhat purer product and a better yield.

EXAMPLE VI

N-benzyl-N'-piperazine acetic acid ethyl ester

Into a 1-liter 3-neck round bottom flask fitted with a mechanical stirrer and a condenser protected with a calcium chloride drying tube is added 300 cc. of ethyl alcohol. Anhydrous sodium bicarbonate (50.4 grams, 0.6 mole) is added to the alcohol along with 51.7 grams (0.3 mole) of N-benzylpiperazine and 36.8 grams (0.3 mole) of ethyl chloroacetate. The mixture is stirred and reacted at reflux temperatures for 16 hours. Following this reaction period, the mixture is filtered to separate the inorganic salts, which inorganic salts are then washed with 75 cc. of ethyl alcohol. The alcohol wash is combined with the alcohol filtrate and the combined alcohols are reduced to dryness on a steam bath under reduced pressure. The oil residue is separated by distillation and 69.2 grams (88%) of N-benzyl-N'-piperazine acetic acid ethyl ester is obtained. B.P. 175–180° C./3.0 mm., $n_D^{25}$ 1.5173.

EXAMPLE VII

N-benzyl-N'-(β,β-diphenyl-β-hydroxyethyl)-piperazine

Into a 1-liter 3-neck round bottom flask fitted with a mechanical stirrer, separatory funnel and a condenser protected with a calcium chloride drying tube is placed 25.3 grams (1.052 mole) of magnesium turnings. Dry ether (100 cc.) is added to the flask followed by a crystal of iodine. To the reaction mixture a few milliliters of 165.2 grams (1.052 mole) of bromobenzene dissolved in 250 cc. of dry ether is added to the flask. The suspension is stirred and after the initial heat of reaction subsides, the remaining bromobenzene solution is added dropwise at a rate to cause vigorous refluxing. After addition is completed, the reaction mixture is stirred and refluxed for one additional hour. The ether is separated by distillation and 250 cc. of dry benzene is added to the reaction mixture. A solution of 69 grams (0.263 mole) of N-benzyl-N'-piperazine acetic acid ethyl ester in 100 cc. of dry benzene is added dropwise to the solution of phenyl magnesium bromide. The mixture is stirred and reacted under reflux temperatures for 16 hours. After this period, the Grignard complex is decomposed by dropwise addition of an ammonium chloride solution (100 grams of ammonium dissolved in 300 cc. of water). The mixture is filtered to remove the insoluble magnesium salt and then washed with two 100 cc. portions of benzene. The benzene layer is separated and concentrated to dryness on the steam bath under reduced pressure. The residue solidifies upon cooling to provide 49.3 grams of N-benzyl-N'-(β,β-diphenyl-β-hydroxyethyl)-piperazine (50.4%), M.P. 116–119° C. One crystallization from ethyl alcohol provides the pure product in a yield of 44.5 grams (45.5%), M.P. 117–119° C.

EXAMPLE VIII

N'-(β,β-diphenyl-β-hydroxyethyl)-piperazine dihydrochloride

To 855 ml. of deionized water is placed 525 grams (1.41 mole) of the base prepared in Example VII. To this mixture is added 234 ml. (2.82 mole) of 37% hydrochloric acid, 427 ml. of ethyl alcohol and 43 grams of 5% palladium on carbon. The combined mixture is placed in an autoclave and hydrogenated at a pressure of 30 pounds per square inch at 50–60° C. Reduction is continued until no more hydrogen is absorbed. This requires about two hours. Following complete reduction, the catalyst is separated by filtration, the water is removed by vacuum distillation and the residue is crystallized from ethyl alcohol. The yield of N'-($\beta,\beta$-diphenyl-$\beta$-hydroxyethyl)-piperazine dihydrochloride is 96%, M.P. 260° C. (dec.). Ultraviolet assay shows the obtained product to be 96.9% pure.

Acid addition and quarternary ammonium salts of the base prepared by Example VIII may be conveniently formed at one or both basic nitrogens in the piperazine ring. Non-toxic acid addition salts may be prepared from a variety of inorganic and strongly organic acids by recourse to the conventional steps known to the art. In similar manner, well-known quaternizing agents such as the alkyl halides may be employed to prepare the quaternary ammonium salts.

Reacting the amino esters disclosed herein with a Grignard reagent results in the desired carbinol amine. Prior to isolation of said carbinol amine, it is a preferred practice to decompose the Grignard complex. This is conventionally performed by a salt of an inorganic acid and an ammonium alkali as disclosed in Example VII. It will be apparent that this particular step can be performed by several means which include adding a strong organic acid followed by an ammonium alkali or adding directly an ammonium salt such as ammonium chloride.

The hydrogenation step of Example III can be performed on the bases prepared by the disclosed process; however, it is preferred to carry out the hydrogenation after purifying the product as the dihydrochloride salt by the process outlined in Example II. This step results in better yields.

A wide range of concentrations of the platinum oxide catalyst can be employed in the catalytic reduction step, but it has been found that about a 3 percent ratio of such catalyst to the reactant, N-($\beta$-diphenyl-$\beta$-hydroxyethyl)-N'-methylpiperazine provides complete reduction.

In preparing the methosulfate salt of N-($\beta$-cyclohexyl-$\beta$-phenyl-$\beta$-hydroxyethyl)-N'-methylpiperazine, the base is liberated from the halide salt thereof and the base may be dissolved in organic solvents such as acetone, ether, chloroform, isopropyl alcohol and the like; however, it has been found that the use of methyl ethyl ketone results in a somewhat purer product and a better yield.

This application is a continuation-in-part of our application filed January 22, 1957, S.N. 635,092, now abandoned.

Others may practice the invention in any of the numerous ways which will be suggested to one skilled in the art upon a reading of this specification. It is intended that all such practice of the invention be included hereunder provided it falls within the scope of the appended claims.

We claim:

1. A process for preparing N-($\beta,\beta$-diphenyl-$\beta$-hydroxyethyl)-N'-methylpiperazine comprising refluxing with an excess of phenyl magnesium halide with N-methyl-N'-piperazine acetic acid ethyl ester in an organic solvent having a boiling point greater than 60° C., adding a salt of an inorganic acid and an ammonium alkali to decompose the Grignard complex in the reaction mixture and recovering N-($\beta$-diphenyl-$\beta$-hydroxyethyl)-N'-methylpiperazine from the organic solvent filtrate.

2. A process for preparing N-($\beta,\beta$-diphenyl-$\beta$-hydroxyethyl)-N'-benzylpiperazine comprising refluxing an excess of phenyl magnesium chloride and N-benzyl-N'-piperazine acetic acid ethyl ester in an organic solvent having a boiling point greater than 60° C., adding a salt of an inorganic acid and an ammonium alkali to decompose the Grignard complex in the reaction mixture and separating N-($\beta,\beta$-diphenyl-$\beta$-hydroxyethyl)-N'-benzylpiperazine from the organic solvent filtrate.

3. A process for preparing N-($\beta,\beta$-diphenyl-$\beta$-hydroxyethyl)-N'-piperazine which comprises the method of claim 2 with the additional step of debenzylating N-($\beta,\beta$-diphenyl-$\beta$-hydroxyethyl)-N'-benzylpiperazine by adding thereto excess inorganic mineral acid, a catalytic amount of platinum oxide and hydrogen gas; conducting the reduction until 1 mole of hydrogen is absorbed and separating N-($\beta,\beta$-diphenyl-$\beta$-hydroxyethyl)-N'-piperazine.

4. A process for preparing N-($\beta$-cyclohexyl-$\beta$-phenyl-$\beta$-hydroxyethyl)-N'-methylpiperazine which comprises the method of claim 1 with the additional steps of mixing a mole of the base prepared by the process of claim 1 with about 3% by weight of platinum oxide based on the weight of said base, adding hydrogen gas to said mixture until three moles of hydrogen are absorbed and recovering N-($\beta$-cyclohexyl-$\beta$-phenyl-$\beta$-hydroxyethyl)-N'-methylpiperazine.

5. A process for preparing N-($\beta$-cyclohexyl-$\beta$-phenyl-$\beta$-hydroxyethyl)-N'-methylpiperazine dihydrochloride which comprises the method of claim 1 with the additional steps of adding excess alcoholic-hydrogen chloride to an alcoholic solution of N-($\beta,\beta$-diphenyl-$\beta$-hydroxyethyl)-N'-methylpiperazine, separating and drying the resulting dihydrochloride salt, mixing a mole of said N-($\beta$-diphenyl-$\beta$-hydroxyethyl)-N'-methylpiperazine dihydrochloride with about 3% by weight of platinum oxide based on the weight of said salt, adding hydrogen to such mixture at about 55–60° C. under about 30 pounds pressure until three moles of hydrogen are absorbed and isolating the product, N-($\beta$-cyclohexyl-$\beta$-phenyl-$\beta$-hydroxyethyl)-N'-methylpiperazine dihydrochloride.

6. A process for preparing the methylsulfate salt of N-($\beta$-cyclohexyl-$\beta$-phenyl-$\beta$-hydroxyethyl)-N'-methylpiperazine which comprises the method of claim 5 with the additional step of placing in a strongly alkaline solution, one mole of the product formed by the method of claim 5 to liberate the base, extracting said base with an organic solvent, dissolving said base in methyl ethyl ketone and adding thereto one mole of dimethylsulfate, filtering and separating the crystallized N-($\beta$-cyclohexyl-$\beta$-phenyl-$\beta$-hydroxyethyl)-N'-methylpiperazine methylsulfate.

7. A method for making amino carbinols of the formula:

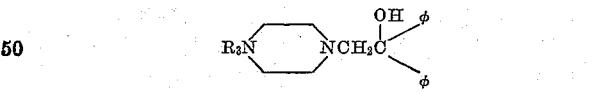

wherein $R_3$ is selected from the class consisting of loweralkyl and benzyl which comprises the steps of reacting under reflux conditions an acid ester of the formula:

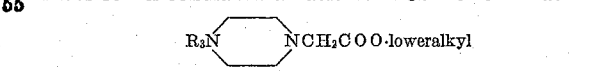

with an excess of phenylmagnesium chloride in an organic solvent having a boiling point greater than 60° C., adding a salt of an inorganic acid and an ammonium alkali to decompose the Grignard complex in the reaction mixture and separating the amino carbinol product from the organic solvent filtrate.

References Cited in the file of this patent

UNITED STATES PATENTS 2,649,444    Barrett et al. _____ Aug. 18, 1953

FOREIGN PATENTS 748,812    Great Britain _____ May 9, 1956
760,038    Great Britain _____ Oct. 31, 1956

OTHER REFERENCES

Drake et al.: Jour. Amer. Chem. Soc., vol. 56, pp. 697–700 (1934).